(12) United States Patent
Laethem et al.

(10) Patent No.: US 10,296,303 B2
(45) Date of Patent: May 21, 2019

(54) VISUAL PROGRAMMING SYSTEM

(71) Applicant: ServiceNow, Inc., Santa Clara, CA (US)

(72) Inventors: Jared Laethem, Carlsbad, CA (US); Carmine Mangione-Tran, San Diego, CA (US); Jeremy Jacobson, San Diego, CA (US)

(73) Assignee: SERVICENOW, INC., Santa Clara, CA (US)

( * ) Notice: Subject to any disclaimer, the term of this patent is extended or adjusted under 35 U.S.C. 154(b) by 0 days.

(21) Appl. No.: 15/939,734

(22) Filed: Mar. 29, 2018

(65) Prior Publication Data

US 2018/0225097 A1     Aug. 9, 2018

Related U.S. Application Data

(63) Continuation of application No. 15/595,213, filed on May 15, 2017.

(60) Provisional application No. 62/336,681, filed on May 15, 2016.

(51) Int. Cl.
   *G06F 8/34*        (2018.01)
   *G06F 3/0486*      (2013.01)
   *G06F 3/0482*      (2013.01)

(52) U.S. Cl.
   CPC .............. *G06F 8/34* (2013.01); *G06F 3/0482* (2013.01); *G06F 3/0486* (2013.01)

(58) Field of Classification Search
   CPC .......................................................... G06F 8/34
   USPC .......................................................... 717/109
   See application file for complete search history.

(56) References Cited

U.S. PATENT DOCUMENTS

| | | | |
|---|---|---|---|
| 5,187,788 A | 2/1993 | Marmelstein | |
| 5,487,141 A * | 1/1996 | Cain .................... | G06F 8/34 715/764 |
| 5,978,585 A | 11/1999 | Crelier | |
| 6,216,261 B1 * | 4/2001 | Mitchell .................... | G06F 8/34 717/107 |
| 7,171,646 B2 | 1/2007 | Charisius et al. | |
| 7,590,970 B2 | 9/2009 | Bromley | |
| 7,849,440 B1 | 12/2010 | Englehart | |
| 8,141,031 B2 | 3/2012 | Iborra et al. | |
| 8,832,667 B2 | 9/2014 | Reusch | |
| 2004/0111702 A1 * | 6/2004 | Chan .................... | G06F 8/34 717/113 |
| 2006/0036995 A1 | 2/2006 | Chickles et al. | |
| 2006/0130020 A1 | 6/2006 | Abdullah | |
| 2006/0294158 A1 | 12/2006 | Tsyganskiy et al. | |
| 2007/0157138 A1 | 7/2007 | Ciolfi et al. | |
| 2011/0093835 A1 * | 4/2011 | Ciolfi .................. | G06F 17/5009 717/105 |
| 2016/0054981 A1 * | 2/2016 | Cao .......................... | G06F 8/34 717/109 |
| 2017/0060541 A1 * | 3/2017 | Saleh ........................ | G06F 8/34 |

* cited by examiner

*Primary Examiner* — John Q Chavis
(74) *Attorney, Agent, or Firm* — Fletcher Yoder PC

(57) ABSTRACT

Methods, systems, and system for generating code using visual blocks. A selection is made from a list of one or more programming blocks. One or more of the programming blocks are selected and used to display a visual programming block that corresponds to the selected one or more programming blocks. This visual programming block is then used to generate or produce output code.

20 Claims, 18 Drawing Sheets

FIG. 4A — 450

| ☑ ≡ | VP API Class |   |   |   |   |   | 🖉 ✓ ≡ ⋯ | [Update] [Delete] ← → |
|---|---|---|---|---|---|---|---|---|
|   | GlideRecord |   |   |   |   |   |   |   |

* Name [GlideRecord]          Application [Global]
  Category [API] 🔍 ⊖        Glide scriptable ☑
                              Script include ☐

[Update] [Delete]

| ≡ VPI API Methods [New] Go to [Name] ▼ [Search] |  |  |  | ✿ ▼ ▼ | [1] to 10 of 10 ▶ ▲ ▲ ▣ |
|---|---|---|---|---|---|
| ▽ Class=GlideRecord |  |  |  |  |  |
| 🔍 | ≡ Name ▲ | ≡ Active | ≡ Return type(data) | ≡ Static |  |
| ☐ ⊖ | addEncodeQuery(Conditions) | true |  | false |  |
| ☐ ⊖ | addQuery(FieldName, Any) | true |  | false |  |
| ☐ ⊖ | addQuery(FieldName, String, Any) | true |  | false |  |
| ☐ ⊖ | getUniqueValue() | true | DTBlock_FieldTextinput | false |  |
| ☐ ⊖ | getValue(FieldName) | true | DTBlock_FieldTextinput | false |  |
| ☐ ⊖ | init(String) | true |  | false |  |
| ☐ ⊖ | next() | true | DTBlock_FieldCheckbox | false |  |
| ☐ ⊖ | query() | true |  | false |  |
| ☐ ⊖ | setValue(FieldName, Any) | true | DTBlock_FieldCheckbox | false |  |
| ☐ ⊖ | update() | true | DTBlock_FieldCheckbox | false |  |
| ☐ Actions on selected rows... ◀ ▶ |  | ▼ |  | [1] to 10 of 10 ▶ ▲ ▲ |  |

FIG. 4B

▽ business                    ⊗

□    ★                        ⊕

Configuration

Business Services             PROCEDURES

Metrics                       LOGIC

Business Rules                LISTS

System Definition             COMPOUND_BLOCK

Business Rules                PRIMITIVES

System Diagnostics            GENERATED

COLLECTIONS

▸ Session Debug               CONTROLS
  Debug Business Rule
  Debug Business Rule (Details)  VARIABLES

TEXT

MATH

GLOBALS when program starts ⊕ — 410
do

```
Blockly.Blocks['query'] = {
    init: function() {                              ←—1210
        this.setColour(325);
        this.appendDummyInput()
            .appendField('query');
        this.setInputsInline(false);
        this.setPreviousStatement(true);
        this.setNextStatement(true);
        this.appendValueInput('tableName0').setAlign(Blockly.ALIGN_RIGHT)
            .appendField('tableName')
            .setCheck('');
        this.appendValueInput('query1').setAlign(Blockly.ALIGN_RIGHT)
            .appendField('query')
            .setCheck('Conditions');
        this.appendDummyInput()
            .appendField(new Blockly.SNC.Field.ScopedVariable('glideRecord', new
                Blockly.Type('GlideRecord')));
        this.appendStatementInput('__Statement2')
            .appendField('do');
    },
    getMethodName: function() {
        return 'query';
    }, getCompoundBlockParameters: function() {
        return ['tableName0', 'query1', '__Statement2'];
    },                                              ←—1220 getStatementNameToCompoundBlockScopedVariables: function(paramName) {
        if (!this.statementNameToCompoundBlockScopedVariable) {
            this.statementNameToCompoundBlockScopedVariable =
                {"__Statement2":["glideRecord"]};
        }
        return this.statementNameToCompoundBlockScopedVariable[paramName]
    },
```

```
getCompoundBlockScript: function() {
    if (!this.compoundBlockScriptLines) {
        this.compoundBlockScriptLines =
        ["(function (tableName0, query1, __Statement2) {","var glideRecord = new
            GlideRecord(tableName0);","glideRecord.addEncodedQuery(query1);","while
            (glideRecord.next()) {","if (__Statement2)
            ","__Statement2¬","}","","})(tableName0, query1, __Statement2);"];
    }
    returnthis.compoundBlockScriptLines
},
isCompoundBlock:true,
getDependentFieldMap:function(){
if(!this.dependentFieldMap){
    this.dependentFieldMap={"query1":{"glideRecord":{"tableName":{"emptyInputName":"ta
        bleName0"}}},"__Statement2":{"glideRecord":{"tableName":{"emptyInputName":"tab
        leName0"}}}};
}
returnthis.dependentFieldMap;
}, getDependentFieldDefinitionMap:function(inputName){
    if(!this.dependentFieldDefinitionMap){
        this.dependentFieldDefinitionMap={"tableName0":{"variableName":"glideRecord","fieldN
            ame":"tableName"},"query1":{"variableName":"glideRecord","newSuppliedBlock":nul
            l,"fieldName":"tableName","fieldType":"String"}};
    }
        returnthis.dependentFieldDefinitionMap[inputName];
    },
};
```

```
//# sourceType=blockly
(function() {
  var tableName0 = 0;
  var query1 = '';
  var __Statement2 = function(glideRecord) {
    var tableName0 = 0;
    var query1 = '';
    var __Statement2 = function(glideRecordA,glideRecord) {
      var tableName0 = 0;
      var query1 = 0;
      var __Statement2 =
   function(glideRecordB,glideRecordA,glideRecord) {

};
      (function (tableName0, query1, __Statement2) {
        var glideRecordB = new GlideRecord(tableName0);
        glideRecordB.addEncodedQuery(query1);
        while (glideRecordB.next()) {
          if (__Statement2)
             __Statement2(glideRecordB,glideRecordA,glideRecord)
        }

})(tableName0, query1, __Statement2);
    };
    (function (tableName0, query1, __Statement2) {
      var glideRecordA = new GlideRecord(tableName0);
      glideRecordA.addEncodedQuery(query1);
      while (glideRecordA.next()) {
        if (__Statement2)
           __Statement2(glideRecordA,glideRecord)
      }

})(tableName0, query1, __Statement2);var tableName0 = 0;
    var query1 = 0;
    var __Statement2 = function(glideRecordC,glideRecord) {

```
1510
    (function (tableName0, query1, __Statement2) {
        var glideRecordC = new GlideRecord(tableName0);
        glideRecordC.addEncodedQuery(query1);
        while (glideRecordC.next()) {
          if (__Statement2)
             __Statement2(glideRecordC,glideRecord)
          }

})(tableName0, query1, __Statement2);
    };
1510
    (function (tableName0, query1, __Statement2) {
        var glideRecord = new GlideRecord(tableName0);
        glideRecord.addEncodedQuery(query1);
        while (glideRecord.next()) {
          if (__Statement2)
             __Statement2(glideRecord)
          }

})(tableName0, query1, __Statement2);var tableName0 = 0;
    var query1 = 0;
    var __Statement2 = function(glideRecordD) {

};
1510
    (function (tableName0, query1, __Statement2) {
        var glideRecordD = new GlideRecord(tableName0);
        glideRecordD.addEncodedQuery(query1);
        while (glideRecordD.next()) {
          if (__Statement2)
             __Statement2(glideRecordD)
          }

})(tableName0, query1, __Statement2);
    })();
```

FIG. 15B

VISUAL PROGRAMMING SYSTEM

CROSS-REFERENCE TO RELATED APPLICATIONS

This application is a continuation of and claims priority to U.S. patent application Ser. No. 15/595,213, filed on May 15, 2017, which claims the benefit of Provisional Application Ser. No. 62/336,681, filed May 15, 2016, entitled "Visual Programming System," both of which are incorporated by reference herein in their entirety.

TECHNICAL FIELD

The present disclosure relates in general to techniques and devices for a visual programming system.

BACKGROUND

A computer-based visual programming system can be used to create applications and scripts by arranging blocks representing activities and functions on a canvas. Individual blocks can represent certain functionality and can be connected with other blocks.

SUMMARY

Disclosed herein are aspects of a visual programming system and associated methods.

According to an implementation, a visual programming system is provided. The system includes a processor and a memory. The memory includes instructions executable by the processor to automatically generate display code for rendering a first visual programming block and generation code for producing output code from a definition of an interface to an application programming interface, render a plurality of visual programming blocks including the first visual programming block on a visual programming canvas responsive to user input using at least the display code of the first visual programming block, and produce output code using at least the generation code of the first visual programming block.

These and other aspects of the present disclosure are disclosed in the following detailed description of the embodiments, the appended claims and the accompanying figures.

BRIEF DESCRIPTION OF THE DRAWINGS

The description herein makes reference to the accompanying drawings wherein like reference numerals refer to like parts throughout the several views.

FIG. 4A is a screen shot illustrating an implementation of a table that includes class definitions that define the interfaces of an API.

FIG. 4B is a screen shot illustrating an implementation of creating a visual program.

FIGS. 12A & 12B include an example code listing illustrating various operations.

FIG. 14 is a screen shot of a compound block and illustrating the scopes and nesting being taken care of.

FIGS. 15A & 15B include an example code listing of code generated from nested blocks.

DETAILED DESCRIPTION

A visual programming system may be utilized for creating applications or scripts in which constituent components are displayed as visual programming blocks (also referred to as blocks) on a visual programming canvas (also referred to as a canvas) area of a screen.

Certain of the blocks may be automatically created from class definitions on the system. Compound blocks can be produced by aggregating individual blocks and provided parameters, and then the compound blocks can, in turn, be combined with other compound blocks. Compound blocks can simplify the visual blocks displayed to a user while maintaining the functionality of the combined blocks.

Display code used to render the blocks and generation code used to produce executable code from the block can be produced automatically for an interface (e.g., class or method) provided by application programming interface (API), such as through a class definition, class reflection, static analysis of source code, run-time instrumentation of execution environments or other technique available for the determining structure and/or function of the API.

Once blocks and required parameters for the blocks are arranged on a canvas, executable code may be produced automatically using the generation code associated with the blocks. The executable code that is thereby generated (i.e. emitted) can take the form of a language (e.g., JavaScript). The resultant JavaScript code can be stored in or used by platform software that can be configured by or execute JavaScript code.

A user interface can be provided by platform software that permits a user to enter JavaScript code. Such a user interface can be enhanced by providing the user the choice between providing the JavaScript code through a text editor, e.g., an IDE that provides color-coding and other functionality for creating JavaScript code or to create the JavaScript code using a visual programming interface, such as using the implementations described herein. The selection can be performed through a drop down, radio button, button, or other user interface elements.

BACKGROUND ARCHITECTURE

Figure 1:
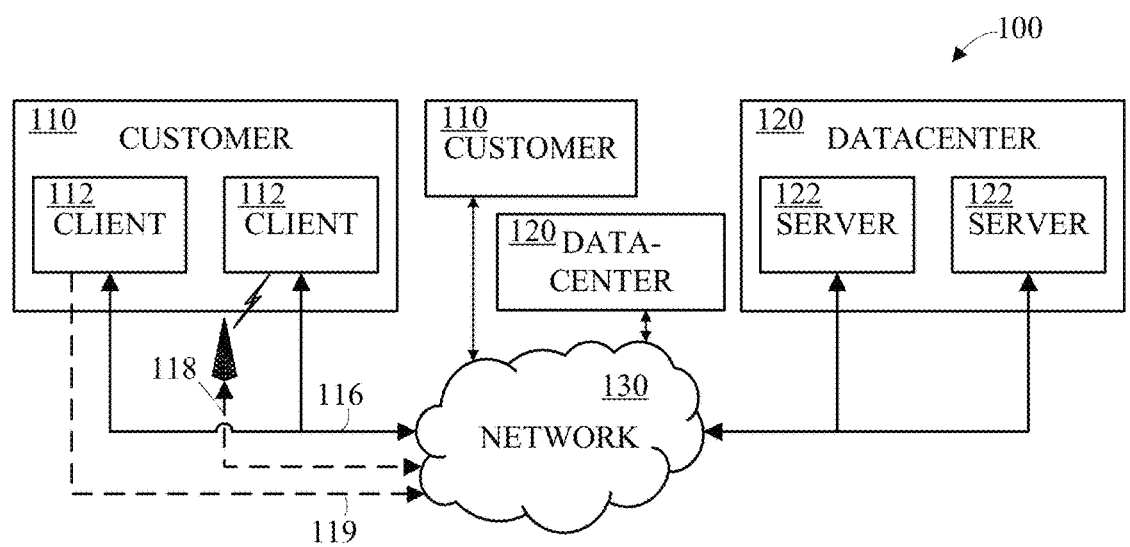
FIG. 1 is a block diagram of a distributed or cloud computing system.

To describe some implementations in greater detail, reference is first made to examples of hardware structures and interconnections usable in implementations of the present disclosure. FIG. 1 is a block diagram of a distributed or cloud computing system 100. Use of the phrase "cloud computing system" herein is a proxy for any form of a distributed computing system, and this phrase is used simply for ease of reference. Cloud computing system 100 can have any number of customers, including customer 110. Each customer 110 may have clients, such as clients 112. Each of clients 112 can be in the form of a computing system including multiple computing devices, or in the form of a single computing device, for example, a mobile phone, a tablet computer, a laptop computer, a notebook computer, a desktop computer, and the like. Customer 110 and clients 112 are examples only, and a cloud computing system may have a different number of customers or clients or may have a different configuration of customers or clients. For example, there may be hundreds or thousands of customers and each customer may have any number of clients.

Cloud computing system 100 can include any number of datacenters, including datacenter 120. Each datacenter 120 may have servers, such as servers 122. Each datacenter 120 may represent a facility in a different geographic location where servers are located. Each of servers 122 can be in the form of a computing system including multiple computing devices, or in the form of a single computing device, for example, a desktop computer, a server computer and the like. The datacenter 120 and servers 122 are examples only, and a cloud computing system may have a different number of datacenters and servers or may have a different configuration of datacenters and servers. For example, there may be tens of datacenters and each datacenter may have hundreds or any number of servers.

Clients 112 and servers 122 may be configured to connect to network 130. The clients for a particular customer may connect to network 130 via a common connection point 116 or different connection points (e.g. a wireless connection point 118 and a wired connection point 119). Any combination of common or different connections points may be present, and any combination of wired and wireless connection points may be present as well. Network 130 can be, for example, the Internet. Network 130 can also be or include a local area network (LAN), wide area network (WAN), virtual private network (VPN), or any other means of transferring data between any of clients 112 and servers 122. Network 130, datacenter 120 and/or blocks not shown may include network hardware such as routers, switches, load balancers and/or other network devices.

Other implementations of the cloud computing system 100 are also possible. For example, devices other than the clients and servers shown may be included in system 100. In an implementation, one or more additional servers may operate as a cloud infrastructure control, from which servers and/or clients of the cloud infrastructure are monitored, controlled and/or configured. For example, some or all of the techniques described herein may operate on said cloud infrastructure control servers. Alternatively, or in addition, some or all of the techniques described herein may operate on servers such as servers 122.

Figure 2:
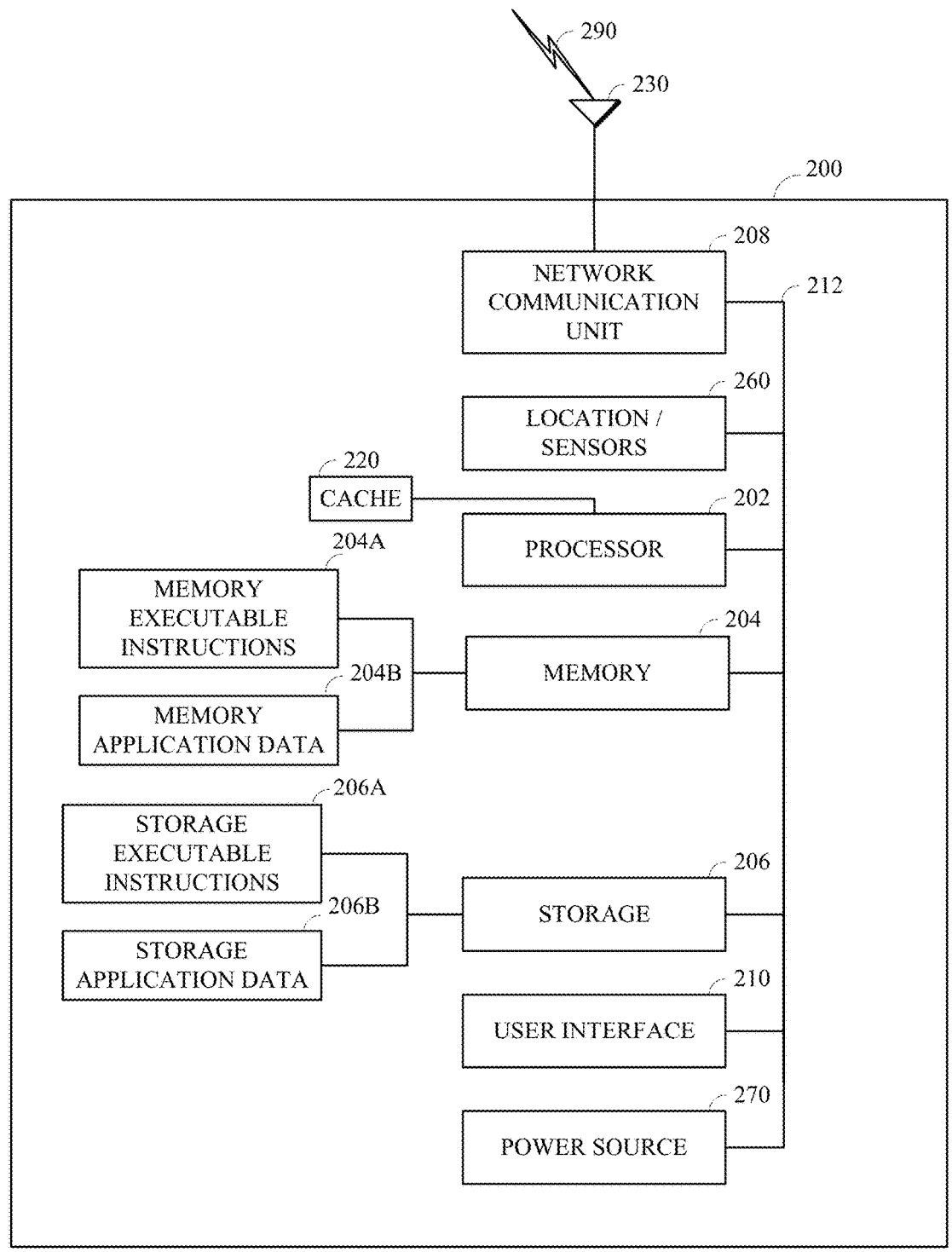
FIG. 2 is a block diagram of an implementation of an internal configuration of a computing device, such as a computing device of the computing system as shown in FIG. 1.

FIG. 2 is a block diagram of an implementation of an internal configuration of a computing device 200, such as a client 112 or server device 122 of the computing system 100 as shown in FIG. 1, including an infrastructure control server of a computing system. As previously described, clients 112 or servers 122 may take the form of a computing system including multiple computing units, or in the form of a single computing unit, for example, a mobile phone, a tablet computer, a laptop computer, a notebook computer, a desktop computer, a server computer and the like.

The computing device 200 can include a number of components, as illustrated in FIG. 2. CPU (or processor) 202 can be a central processing unit, such as a microprocessor, and can include single or multiple processors, each having single or multiple processing cores. Alternatively, CPU 202 can include another type of device, or multiple devices, capable of manipulating or processing information now-existing or hereafter developed. When multiple processing devices are present, they may be interconnected in any manner, including hardwired or networked, including wirelessly networked. Thus, the operations of CPU 202 can be distributed across multiple machines that can be coupled directly or across a local area or other network The CPU 202 can be a general-purpose processor or a special-purpose processor.

Random Access Memory (RAM) 204 can be any suitable non-permanent storage device that is used as memory. RAM 204 can include executable instructions and data for access by CPU 202. RAM 204 typically comprises one or more DRAM modules such as DDR SDRAM. Alternatively, RAM 204 can include another type of device, or multiple devices, capable of storing data for processing by CPU 202 now-existing or hereafter developed. CPU 202 can access and manipulate data in RAM 204 via bus 212. The CPU 202 may utilize a cache 220 as a form of localized fast memory for operating on data and instructions.

Storage 206 can be in the form of read only memory (ROM), a disk drive, a solid-state drive, flash memory, Phase-Change Memory (PCM), or any form of non-volatile memory designed to maintain data for some duration of time, and preferably in the event of a power loss. Storage 206 can include executable instructions 206A and application files/data 206B along with other data. The executable instructions 206A can include, for example, an operating system and one or more application programs for loading in whole or part into RAM 204 (with RAM-based executable instructions 204A and application files/data 204B) and to be executed by CPU 202. The executable instructions 206A may be organized into programmable modules or algorithms, functional programs, codes, and code segments designed to perform various functions described herein. The operating system can be, for example, a Microsoft Windows®, Mac OS X®, or Linux® operating system, or can be an operating system for a small device, such as a smart phone or tablet device, or a large device, such as a mainframe computer. The application program can include, for example, a web browser, web server and/or database server. Application files 206B can, for example, include user files, database catalogs and configuration information. In an implementation, storage 206 includes instructions to perform the discovery techniques described herein. Storage 206 may comprise one or multiple devices and may utilize one or more types of storage, such as solid state or magnetic.

The computing device 200 can also include one or more input/output devices, such as a network communication unit 208 and interface 230 that may have a wired communication component or a wireless communications component 290, which can be coupled to CPU 202 via bus 212. The network communication unit 208 can utilize any of a variety of standardized network protocols, such as Ethernet, TCP/IP, or the like to effect communications between devices. The interface 230 can comprise one or more transceiver(s) that utilize the Ethernet, power line communication (PLC), WiFi, infrared, GPRS/GSM, CDMA, etc.

A user interface 210 can include a display, positional input device (such as a mouse, touchpad, touchscreen, or the like), keyboard, or other forms of user input and output devices. The user interface 210 can be coupled to the processor 202 via the bus 212. Other output devices that permit a user to program or otherwise use the client or server can be provided in addition to or as an alternative to display 210. When the output device is or includes a display, the display can be implemented in various ways, including by a liquid crystal display (LCD) or a cathode-ray tube (CRT) or light emitting diode (LED) display, such as an OLED display.

Other implementations of the internal configuration or architecture of clients and servers 200 are also possible. For example, servers may omit display 210. RAM 204 or storage 206 can be distributed across multiple machines such as network-based memory or memory in multiple machines performing the operations of clients or servers. Although depicted here as a single bus, bus 212 can be composed of multiple buses, that may be connected to each other through various bridges, controllers, and/or adapters. Computing devices 200 may contain any number of sensors and detectors that monitor the device 200 itself or the environment around the device 200, or it may contain a location identification unit 260, such as a GPS or other type of location device. The computing device 200 may also contain a power source 270, such as a battery, so that the unit can operate in a self-contained manner. These may communicate with the CPU/processor 202 via the bus 212.

Figure 3:
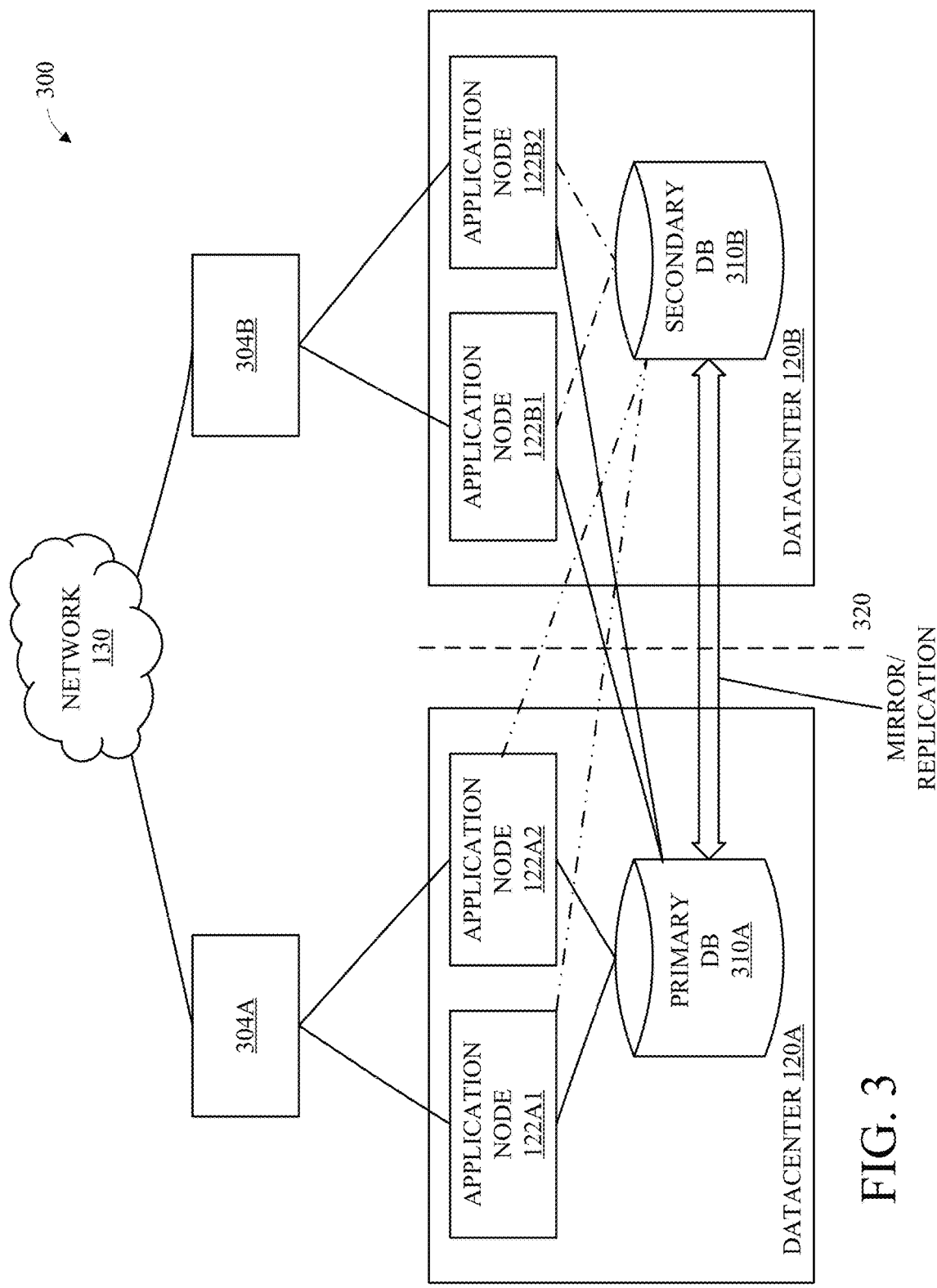
FIG. 3 is a block diagram of an implementation of a high availability processing system.

FIG. 3 is a block diagram of an implementation of a high availability processing system. The illustrated distributed computing system 300 can be, for example, an implementation of datacenter 120 and network 130 of FIG. 1. Broadly, the system 300 includes load balancers 304A, 304B and two datacenters 120A, 120B. The load balancers 304A, 304B are coupled to a telecommunications network graphically depicted by network 130. Load balancers 304A, 304B may also include reverse proxy load balancers.

The datacenter 120A includes a primary database 310A, and the datacenter 120B includes a secondary database 310B. The datacenters 120A, 120B operate in such a manner that the secondary database 310B can provide an exact or substantially exact mirror of the primary database 310A. A line 320 is used to graphically emphasize the logical boundary between datacenters 120A and 120B. Depending upon the intended application, the databases 310A, 310B may be implemented using, for example, a relational database management system (RDBMS), an object database, an XML database, flat files, or the like.

Each datacenter can include two application nodes 122A1, 122A2, 122B1, 122B2 (collectively or individually by way of example 122), although a greater or lesser number can be used depending on the implementation. The application nodes can be implemented using processing threads, virtual machine instantiations, or other computing features of the datacenters that run programs on behalf of remotely sited clients, and exchange related data with such clients via the network 130. In connection with running these programs, occasions arise for the application nodes to store and retrieve data, with the databases 310A and 310B filling this role. In an implementation, each of the application nodes connects to a single primary database, regardless of whether said database is located in the same datacenter as said application node. For example, a primary database may be read/write and a secondary database may be configured to be read-only such that it mirrors changes from the primary database. Requests to the system 300 may be routed to the application nodes in the datacenter of the primary database first, followed by the other datacenter. In a failover situation, the secondary database may become read/write with the formerly primary database switched to mirror the secondary database (which becomes the primary database). In this situation, each application node can be reconfigured to point to the secondary database (now the primary database) as shown by the dashed lines.

As mentioned above, each datacenter 120A, 120B may have its own load balancer 304A, 304B. Each load balancer may be configured to direct traffic to respective servers and processing nodes located within its datacenter. In regard to proxy services, in one example the load balancers 304A, 304B are configured to provide a single Internet-delivered service to remote clients via the network 130, where this service is actually provided by a server farm composed of the computerized servers of the datacenters 120A, 120B. The components 304A, 304B also coordinate requests from remote clients to the datacenters 120A, 120B, simplifying client access by masking the internal configuration of the datacenters. The components 304A, 304B may serve these functions by directing clients to processing nodes as configured directly or via DNS. Load balancer 304A, 304B can be configured for sticky sessions. With sticky sessions, the load balancer can attempt to forward all requests from a client to the same application node 122A1, 122A2. Different sticky session implementations are available. For example, in an implementation, a load balancer can be configured to direct all requests associated with a particular session to a same application node, so long as that node is available.

In regard to load balancing, the components 304A, 304B can be configured to direct traffic to the secondary datacenter in the event the primary datacenter 120A experiences one of many enumerated conditions predefined as failure. The load balancing functionality of the components 304A, 304B can be provided as separate components or as a single component.

The features and implementations associated with systems and methods disclosed herein can be included, in whole or in part, as part of one or more graphical display regions for outputting data to display for a user. In an implementation, a graphical display region can comprise part of a software graphical user interface constituting data that reflects information ultimately destined for display on a hardware device. For example, the data can contain rendering instructions for bounded graphical display regions, such as windows, or pixel information representative of controls, such as buttons and drop-down menus. The rendering instructions can be in the form of HTML, SGML, JavaScript, Jelly, AngularJS, or other text or binary instructions for generating a graphical user interface on a display that can be used to generate pixel information. A structured data output of one device can be provided to an input of the hardware display so that the elements provided on the hardware display screen represent the underlying structure of the output data.

Visual Programming System Architecture

A visual programming system is a tool for creating applications or scripts using graphical blocks. A requirement that blocks must be manually created for use with a visual programming system can reduce the effectiveness of these tools for larger scale development, such as in an enterprise or platform environment.

An implementation of a visual programming system can provide automated features that can improve the effectiveness of visual programming for generating applications and scripts. These automated features can include automatically creating visual blocks from class definitions and automatically generating code for execution from the blocks. The creation can include automatically producing display code to render blocks appropriate for class and function definitions of an API and automatically producing generation code to generate output code after the blocks are combined and then executed. Although implementations herein may describe the generation of JavaScript, in alternative implementations, code can be output in any programming language with a known grammar, and the discussion of JavaScript below can be applied equally to other languages.

FIG. 4A is a screen shot 450 illustrating an implementation of a table that includes class definitions that define the interfaces of an API. Display code to render blocks for this API and generation code to use this API may be produced based on this table and other data associated with the functions listed therein. For example, the definition of "getUniqueValue( )" with a return value of "DTBlock_FieldTextInput" can prompt the system to generate code to render a block without any inputs and with an output based on the return value.

FIG. 4B is a screen shot illustrating an implementation of creating a visual program. In the initial display 400, a block element 410 is provided that visually depicts the start of a program. The blocks generated for APIs such as described above with respect to FIG. 4A can be used by dragging the block into block element 410 in response to user input, such as by using a pointing or touchscreen device.

Figure 5:
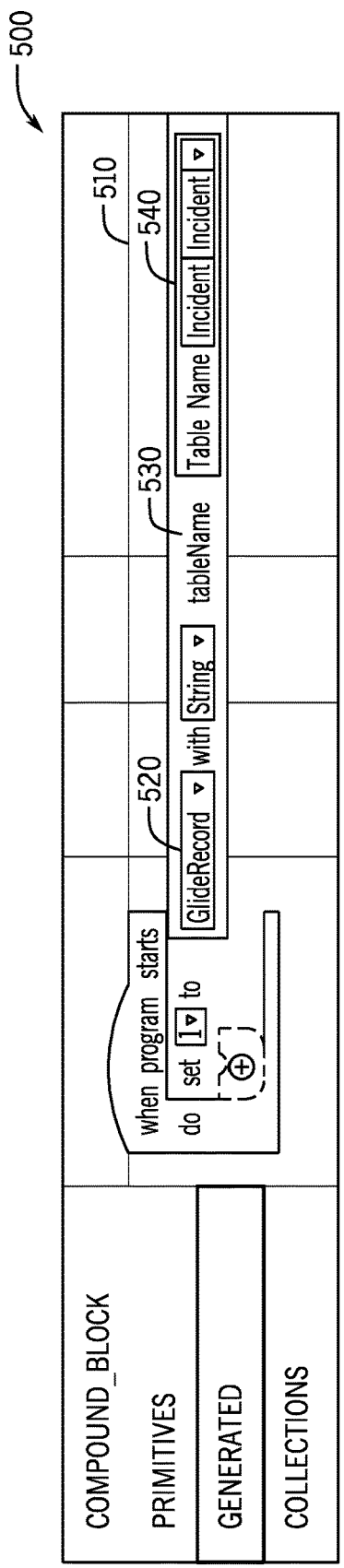
FIG. 5 is a screen shot illustrating the creation of a visual block.

FIG. 5 is a screen shot illustrating the creation of a visual block 510 to instantiate or refer to a GlideRecord 520 class (e.g., a database access class), which has methods that may have return types, and they may or may not be static. The GlideRecord visual block allows the programmer access to the constituent components of the class, such as a tableName 530 that can point to a table (e.g., an incident table 540). This block 510 can be generated/rendered automatically without requiring the writing of additional code.

Figure 6:
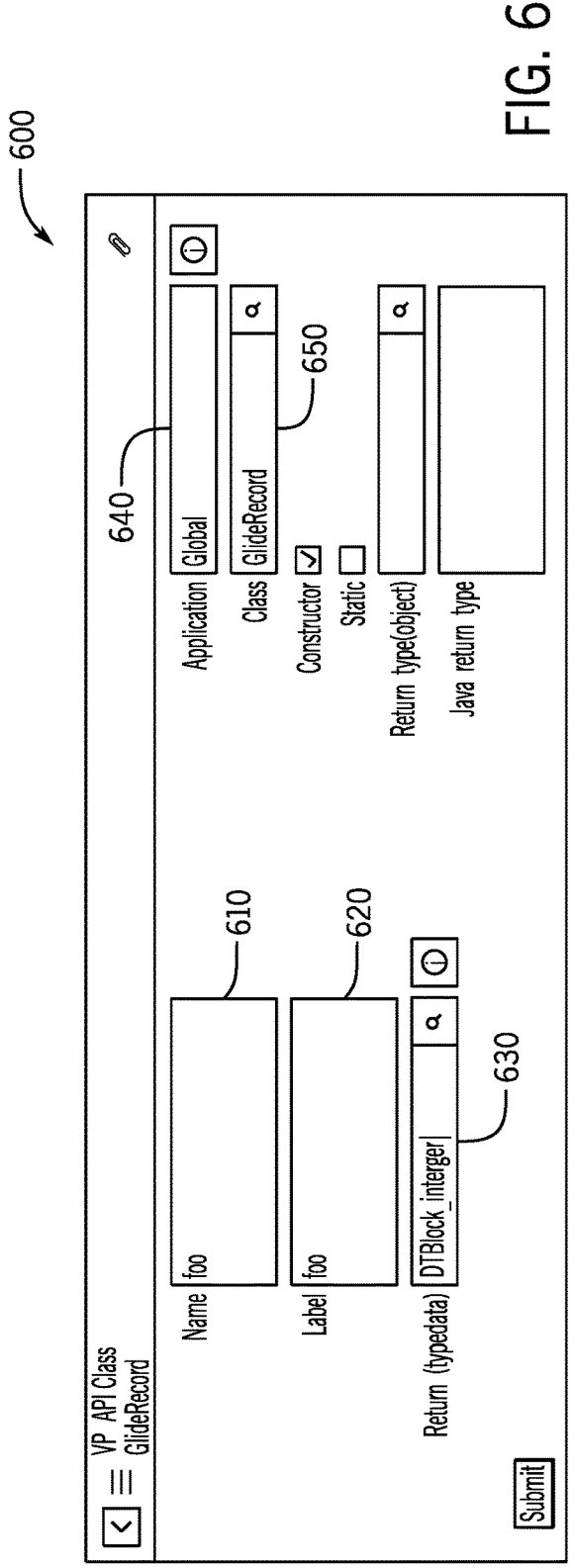
FIG. 6 is a screen shot illustrating a new method entry form for the class.

FIG. 6 is a screen shot illustrating a new method entry form for a class. The new method, "foo," is provided in a name field 610 and label field 620, and a return type of integer is specified in a return type field 630. The function scope is identified as Global in the application field 640, and it is identified as being a part of the class GlideRecord 650.

Figure 7:
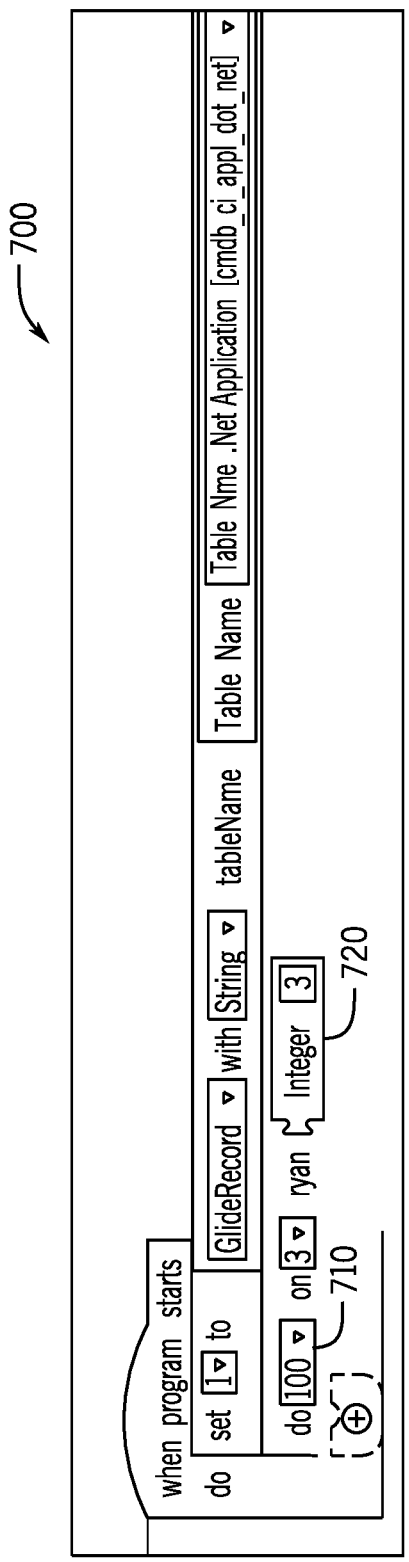
FIG. 7 is a screen shot illustrating the availability of a newly added method.

FIG. 7 is a screen shot illustrating the availability of a newly added method. As can be seen, the method foo 710 is now available for selection. When foo is selected, the system knows that foo returns an integer, and thus presents a display block 720 that requests an integer return value. The user, in this example, specifies an integer return value of "3". The class definition assumes that the underlying class includes the defined method. In this example, the class GlideRecord must actually implement the method "foo" for the block generated from this class definition to output code that will result in the execution of the foo method.

While class definitions can be used to automatically generate the blocks, the class definitions themselves can be automatically generated using a number of different methods other than a manual class definition, such as by using Java Reflection. In such an implementation, to the extent that application program interface (API) points are exposed in JavaScript, they can be located and inserted automatically for the APIs. In an alternative implementation, a static analysis of API code can be performed to generate a set of stacks for which APIs are available. Also, an analysis can be done at run-time by actually examining how the JavaScript is behaving while it is being executed by the JavaScript runtime engine. In an implementation, JavaScript annotations may be used to determine which interfaces of an API should be exposed as blocks in the visual programming system.

Advantageously, the use of visual programming and automatic generation of block generation code can mitigate against the introduction of programming errors, given that, according to an implementation, there may be only one set of code that produces display code and generation code. Thus, the resulting output code (e.g., JavaScript) can be produced in a common way across all blocks, even though the generation code may be customized for each block based on that block's associated interface to an API.

Figure 8:
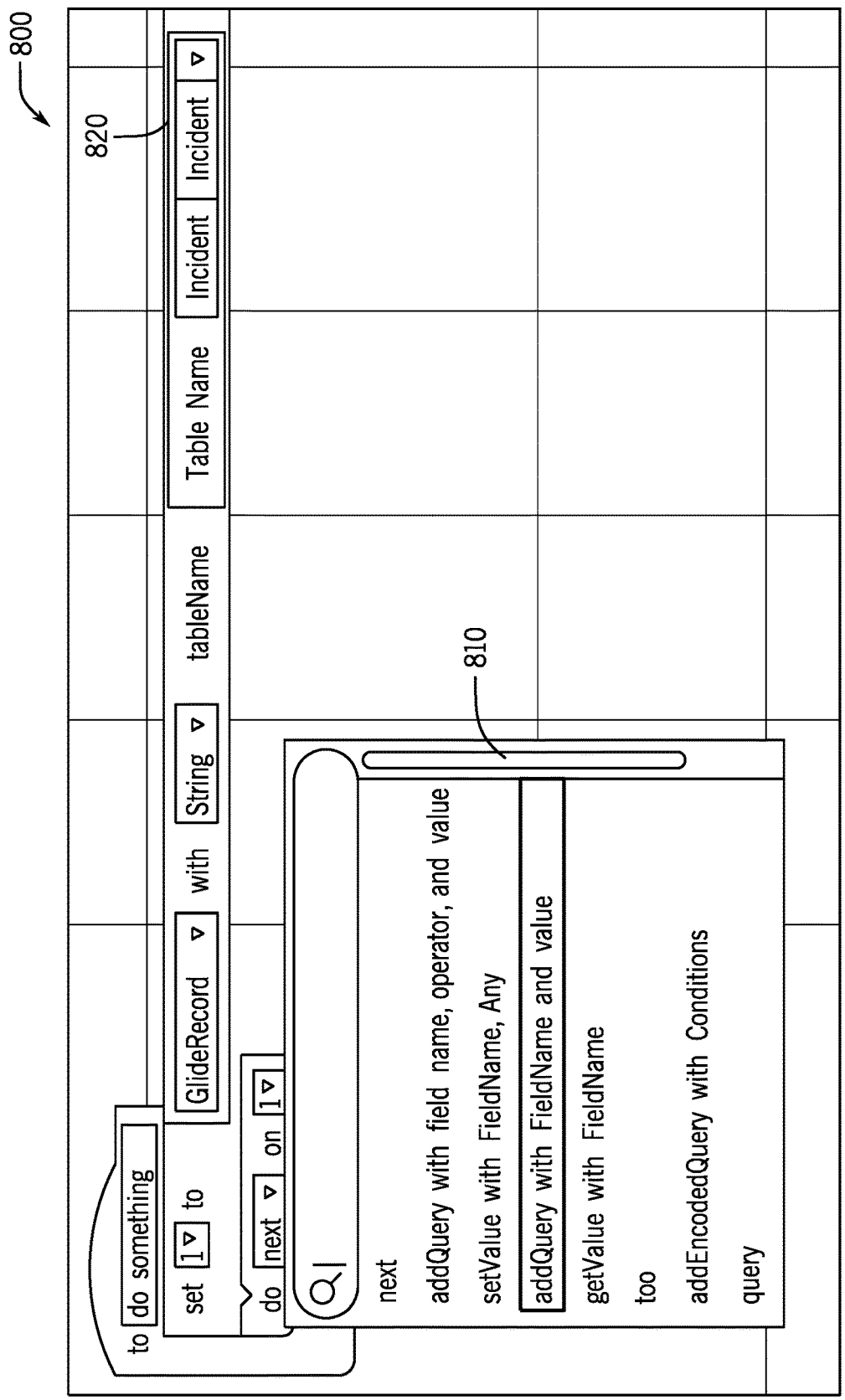
FIG. 8 is a screen shot in which a method is added to an instantiation of a class.

FIG. 8 is a screen shot in which an addQuery method is added to an instantiation of class GlideRecord. The addQuery method may be selected 810 from a list of methods, and an incident state 820 may be added.

Figure 9A:
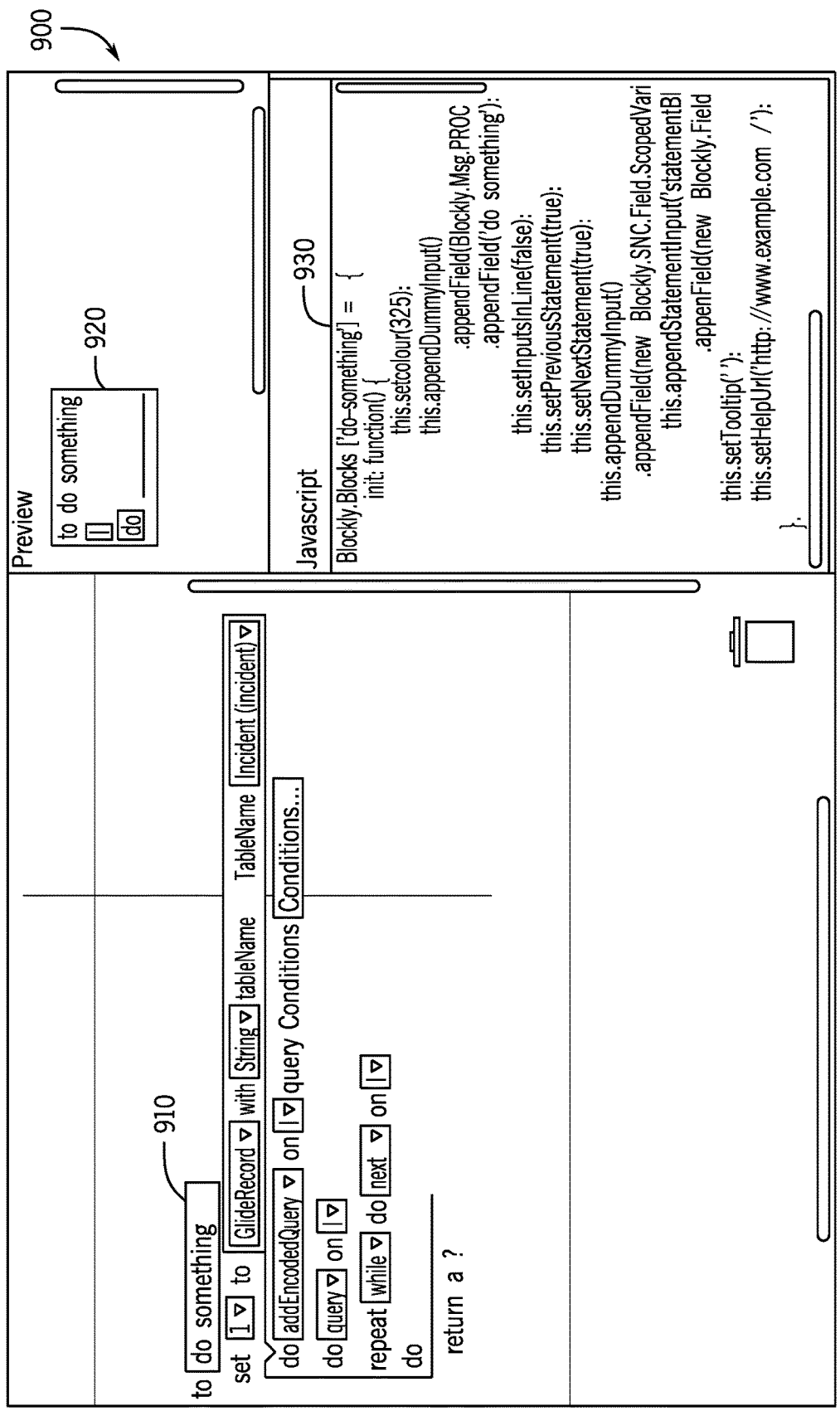
FIGS. 9A & 9B are screen shots of a display of a visual programming system and a compound block.

FIG. 9A, which is a screen shot of an overall display of an implementation of a visual programming system, illustrates how, as the visual block element 910 builds on the display 900, it can become visually complex. In a top-right region of the display, a corresponding prototype compound block 920 that abstracts out the visual block element to remove certain blocks, inputs and outputs, while preserving aspects (e.g., unfilled inputs and outputs to the visual block is displayed). In a bottom-right region of the display, output code 930 generated using the generation code of the constituent blocks disposed within visual block element 910 is shown. The visual programming system can be configured to automatically update prototype compound block 920 and output code 930 as the user updates the configuration of and blocks within visual block element 910 by updating aspects of the blocks (e.g., changing the inputs to or outputs of blocks within visual block element 910, adding blocks, removing blocks, or a combination thereof).

The prototype compound block 920 can be saved, and the display code and generation code of the resulting compound block can be automatically produced without having to write any further code.

Figure 9B:
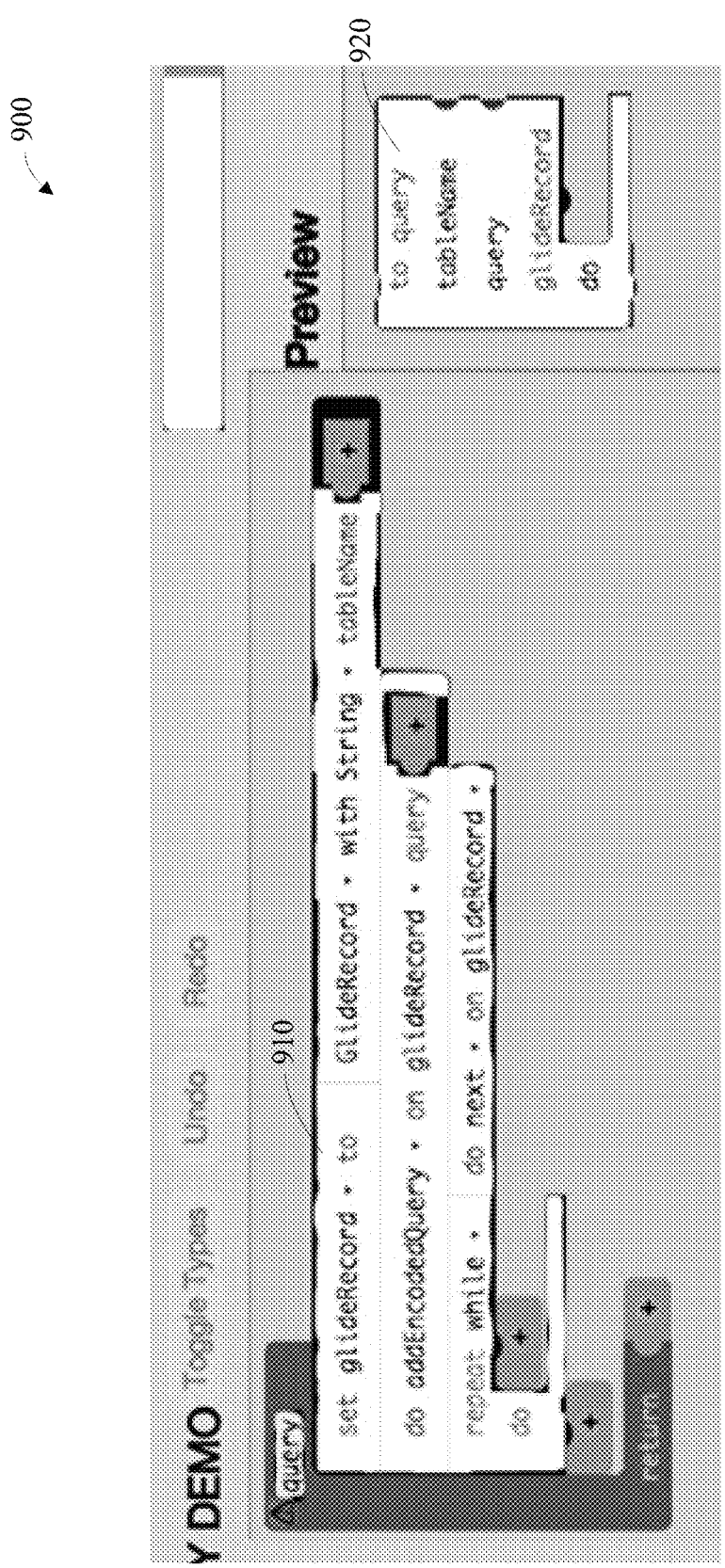

As shown in FIG. 9B which is a similar screen shot to FIG. 9A, a collection of blocks can be reduced to a simpler block while preserving its behavior. In the example shown in FIG. 9B, the compound block includes: a) the query field is "bound" to the table name so that only fields from the table are displayed (but this table is not defined until generation time); b) the types from the original blocks are preserved in the compound block; and c) the block becomes its own scoped entity. This is a way of refactoring the blocks into a compound block for subsequent use.

Figure 10:
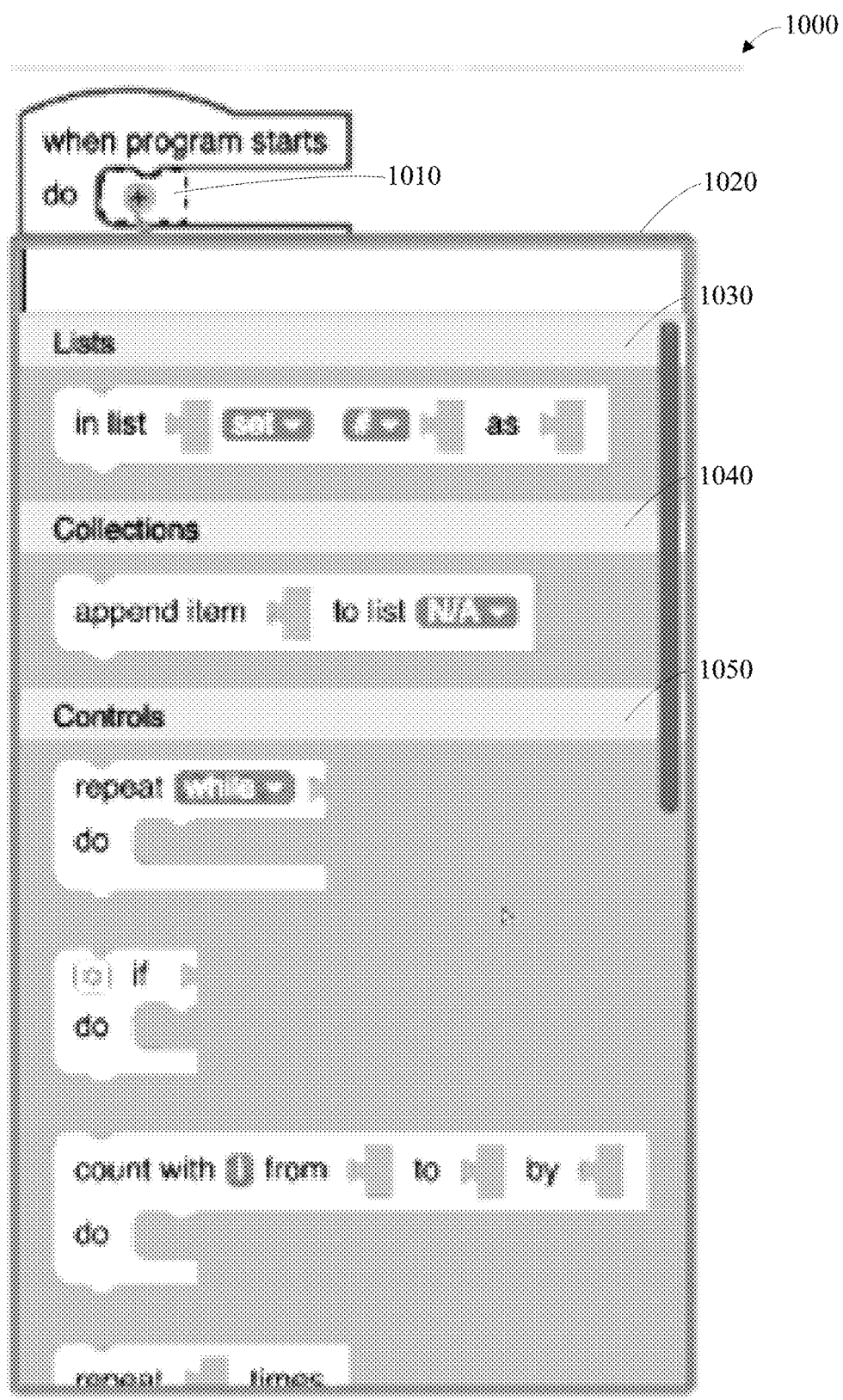
FIGS. 10 & 11 are screen shots illustrating a use of a suggestion block.

FIG. 10 is a screen shot illustrating a use of a suggestion block. The display 1000 shows how a selection of the do element 1010 causes an element, such as a drop-down list block 1020, to provide suggestions for the types of elements that can be used at a particular location. For example, as shown, possible selectable elements include lists 1030, collections 1040, and controls 1050. In an implementation, suggestion blocks can be driven by typing script into the canvas in addition to the graphical dragging and dropping of visual elements.

Figure 11:
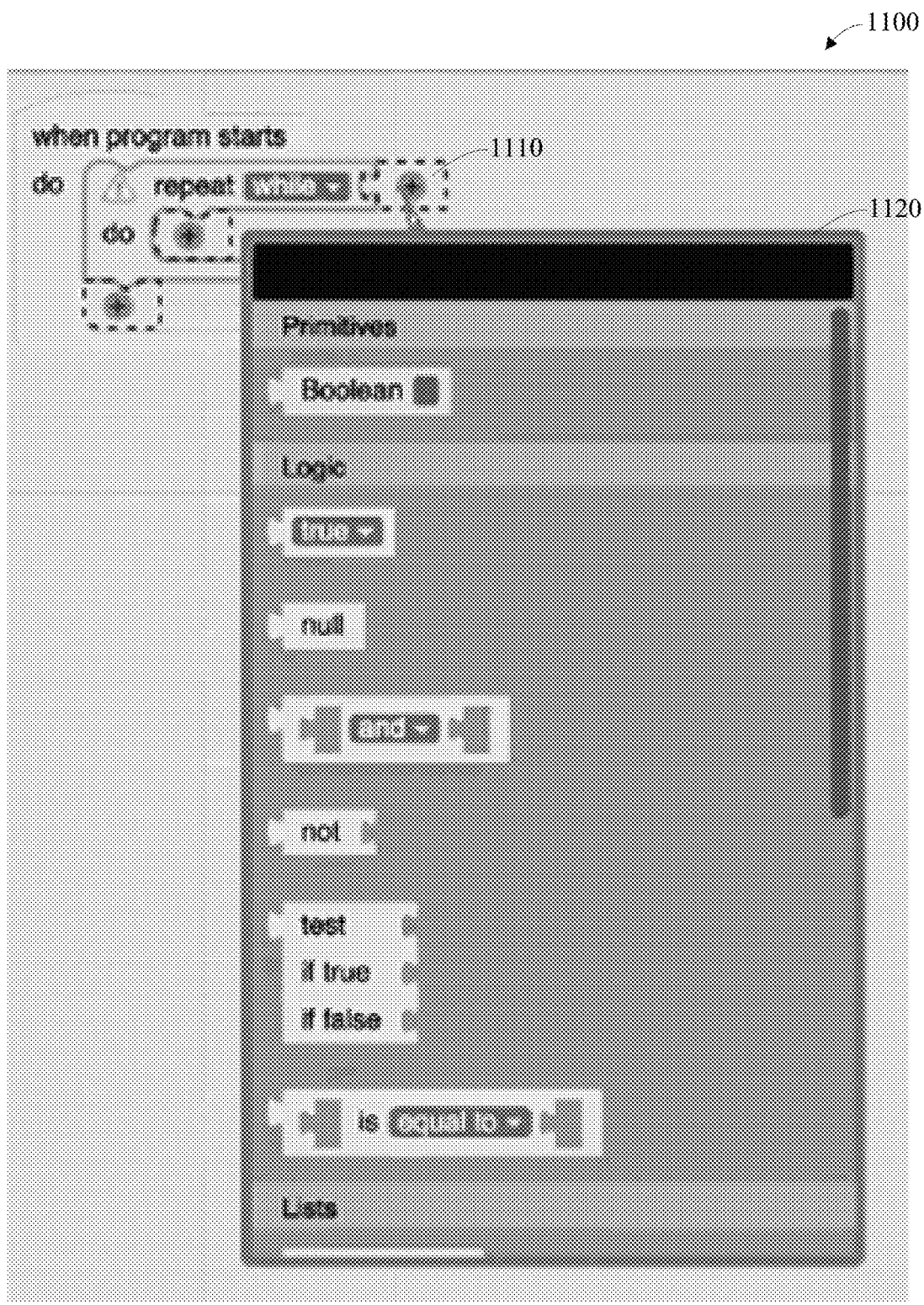

FIG. 11 is a screen shot illustrating a use of a suggestion block. The display 1100 shows how a selection of the while condition, which must evaluate to a Boolean expression, only provides, in a drop-down list block 1120, only options that ultimately evaluate to a Boolean value. Although a drop-down list box is shown as a selection mechanism, one of ordinary skill in the art will appreciate that any form of selection mechanism that presents selectable options to a user can be used. In order to provide meaningful options with such a selection mechanism, in an implementation, variables may be strongly typed. This allows the selection mechanism to determine suitable selection options that are properly of the same type of the selected entity.

When a function or construct representation has parameters, in an implementation, in order to assist the user in getting at the arguments, the user can drag the parameters from the representation so that they can be filled in. For example, a user can drag an indicator of the loop variable to create a do block.

To generate a compound block, the system can take the code from constituent blocks and can automatically generate the compound block code. In an implementation, the compound block is first traversed to determine what elements are missing from it. Making this determination allows the system to allow the user to plug in the missing elements. The compound block is generated by putting together a number of blocks, and then determining what the inputs are and what the outputs are to that group of blocks to create the compound block.

If the compound block is assigned a return value, that can become its output. If there is no return value, then the compound block may not have an output. Any time, however, that a hole is left in a constituent block, a hole is created for the compound block that will require a user to fill it in. The system also allows renaming of the compound block, since the original name might not be meaningful to an external user who cannot see the internal details of the compound block. Thus, in addition to the automatic generation of code based on class definitions to create API points, the system, according to an implementation, can perform the automatic generation of code for compound blocks.

As previously described, there can be two stages for creating the block—producing display code and producing generation code. The first stage of producing display code permits the rendering of the physical representation of the block that can be placed on a canvas and that informs a user where the holes are that require something else to be plugged in. If there is a type to those holes, assistance can be provided so that the wrong type of data is not used in a particular hole.

The second stage for creating the block involves producing generation code (e.g., how the JavaScript code to be run is generated from the block). For both API blocks and compound blocks, it is not known what the output code will look like until the user plugs everything into the holes of a particular block, at this stage, generation code must be emitted/generated that can recognize other blocks that are plugged into the current block and appropriately generate output code for any such valid combination of blocks.

In one implementation, a basic block may be generated that can expose the entire functionality of a given API and can permit the creation of subsequent compound blocks. The subsequently created compound blocks may be utilized to expose certain desirable inputs or outputs of the basic block for particular use cases. For example, a compound block can be created from a glide record (database access) block that is configured to query for all records matching criteria x and y from a predefined table (e.g. an incident table). Such a compound block can greatly simplify the use of the visual programming system by replacing a large number of possible inputs and outputs and reducing those inputs and outputs to two—criteria x and y.

When compound blocks are created, the scoping of variables can be addressed to avoid collisions between variables within and outside of the compound block. Compound blocks can create new scope because the inside of the compound block is not visible, and the inside of a compound block can be quite complex.

When multiple blocks are combined, a mechanism to generate unique names can permit their combination without having variable names collide. That is, since the routine that produces code from the blocks is outputting code to a language, such as JavaScript, this code production process can create conflicts with variables being defined within the compound block that could collide with names that were already in the compound blocks. Thus, the function calls can be created in a way such that the names and name spaces do not collide. This can be of particular use when compound blocks are placed inside of other compound blocks. The compound blocks can have their own scope internally, so as to avoid creating scope problems externally.

In an implementation, a two-pass system may be used where initially the first pass generator produces source code, and then this source code is parsed to resolve variable conflicts and scoping issues (i.e., patching up the variables) to produce final source code. This final source code can then be compiled or interpreted to have executable code. However, in another implementation, the scoping can be performed without going in and patching up the variables. By way of example, a user writes code defining variables A through D, and the user wants to use a compound block. The compound block opens a record, scans it, and then allows the user to perform functions like ask "what is the value of name", "what is the value of an employee identification number", etc., on the record. The visualization of the compound block has a hole for a statement input, and floating above it are the variables that are available for the user to use in the record. The user defines the variables A through D above the compound block context, but these variables need to be input into the compound block. But the compound block also has its own variables for the record that are found within the scope of the compound block. By ensuring that the variable names do not collide, it is possible to perform a stacking of scopes on top of each other.

FIGS. 12A & B include an example code listing 1200. Block code may be generated as the compound blocks can be built and stored when the block is stored. A first component of the code 1210 can perform block visualization and type checking. The "this" element in the init function represents the smaller block that is being generated. A second component of the code 1220 provides the scoped variable rules—these rules represent pre-generated relationships that are to be later determined. By way of example, if the user selects a query and then fills in a table name, only fields from that table should be shown. This variable is bound to the table name. A third component of the code 1230 provides pre-generated code to be completed when the compound block is used. This is parsed when emitting the final code. In the compound block, there are values that are missing, so code must be generated that allows values to be plugged in when the users actually fill in the values (implemented in the example shown as a JSON list). A fourth component of the code 1240 provides dependent field mappings. The dependent field mappings relate to the scoped variable rules that allow the system to determine what is in scope at any of the statement lines. In the illustration shown, the glide record is bound to the statement input below, meaning that the statement input can access that particular (instance of a) GlideRecord.

Figure 13:
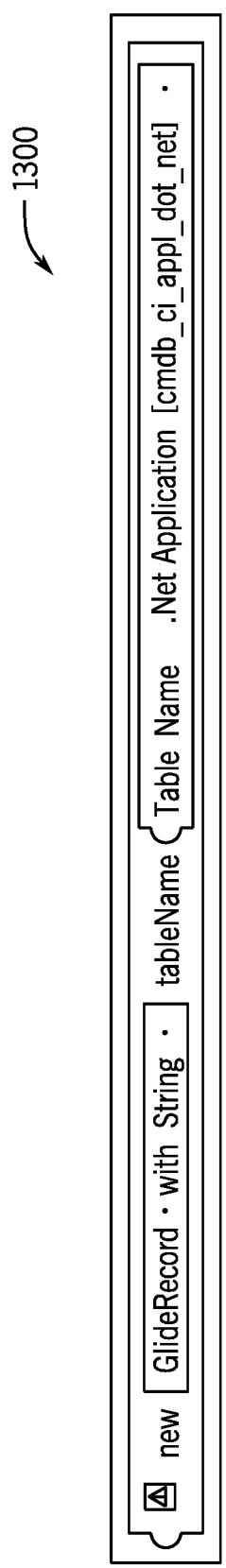
FIG. 13 is a screen shot that shows an example of automatic rendering of a record from a database.
Figure 14:
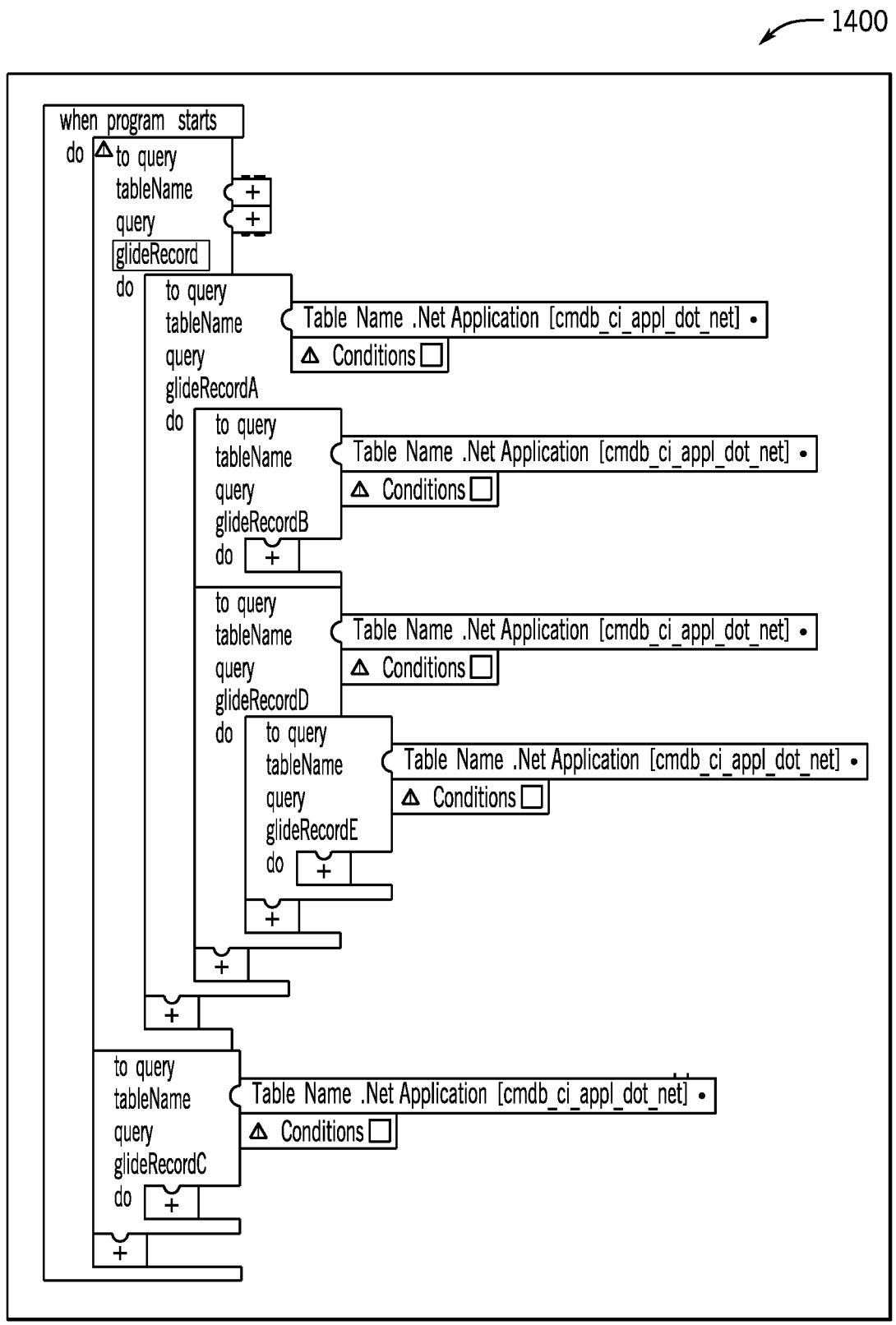

FIG. 13 is a screen shot 1300 that shows an example of automatic rendering of a record from the database. FIG. 14 is a screen shot 1400 of a nested compound block. FIGS. 15A & B include an example code listing 1500 of code generated from nested blocks that can, among other features, preserve scope renaming and prevent name collisions from customer-created blocks. The functions calls 1510 illustrate the nesting of the blocks.

The avoiding of variable name collisions when combining blocks may be achieved by automatically renaming variables so that they are globally unique. Thus, when a first compound block is dropped into a second compound block, there are two different workspaces, and the internals are changed to prevent name conflicts.

In a first way to avoid collisions, a global list of all variables can be maintained. By way of example, a scoped variable, like a glide record, can require each query to be handled in a particular way. If a user adds many of these queries to a block, that glide record should be renamed for each of the queries. A new variable name is created for each instance (e.g., glide record A, glide record B). There is a mapping that indicates which (and how) each scoped variable is renamed. The system can keep track of the order that the scoped variable is declared at each of the statement inputs, so it can access its scoped variables and determine their original names. Thus, the system can determine which names need to be injected so as to keep variables from colliding in different scopes. In a second way to avoid collisions, self-calling functions may be utilized (as in the nested code example of FIGS. 15A & B).

All or a portion of aspects of the invention described herein can be implemented using a general-purpose computer/processor with a computer program that, when executed, carries out any of the respective techniques, algorithms and/or instructions described herein. In addition, or alternatively, for example, a special-purpose computer/processor can be utilized which can contain specialized hardware for carrying out any of the techniques, algorithms, or instructions described herein.

The implementations of computing devices as described herein (and the algorithms, methods, instructions, etc., stored thereon and/or executed thereby) can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination.

For example, one or more computing devices can include an ASIC or programmable logic array such as a field-programmable gate array (FPGA) configured as a special-purpose processor to perform one or more of the operations or operations described or claimed herein. An example FPGA can include a collection of logic blocks and random access memory (RAM) blocks that can be individually configured and/or configurably interconnected in order to cause the FPGA to perform certain functions. Certain FPGA's may contain other general or special-purpose blocks as well. An example FPGA can be programmed based on a hardware definition language (HDL) design, such as VHSIC Hardware Description Language or Verilog.

The embodiments herein may be described in terms of functional block components and various processing operations. Such functional blocks may be realized by any number of hardware and/or software components that perform the specified functions. For example, the described embodiments may employ various integrated circuit components (e.g., memory elements, processing elements, logic elements, look-up tables, and the like) which may carry out a variety of functions under the control of one or more microprocessors or other control devices. Similarly, where the elements of the described embodiments are implemented using software programming or software elements the invention may be implemented with any programming or scripting language such as C, C++, Java, assembler, or the like, with the various algorithms being implemented with any combination of data structures, objects, processes, routines or other programming elements. Functional aspects may be implemented in algorithms that execute on one or more processors. Furthermore, the embodiments of the invention could employ any number of conventional techniques for electronics configuration, signal processing and/or control, data processing and the like. The words "mechanism" and "element" are used broadly and are not limited to mechanical or physical embodiments, but can include software routines in conjunction with processors, etc.

Implementations or portions of implementations of the above disclosure can take the form of a computer program product accessible from, for example, a computer-usable or computer-readable medium. A computer-usable or computer-readable medium can be any device that can, for example, tangibly contain, store, communicate, or transport a program or data structure for use by or in connection with any processor. The medium can be, for example, an electronic, magnetic, optical, electromagnetic, or a semiconductor device. Other suitable mediums are also available. Such computer-usable or computer-readable media can be referred to as non-transitory memory or media, and may include RAM or other volatile memory or storage devices that may change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. In other words, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the invention unless the element is specifically described as "essential" or "critical".

The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The use of the terms "a" and "an" and "the" and similar referents in the context of describing the invention (especially in the context of the following claims) should be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Finally, the operations of all methods described herein are performable in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed.

All references, including publications, patent applications, and patents, cited herein are hereby incorporated by reference to the same extent as if each reference were individually and specifically indicated as incorporated by reference and were set forth in its entirety herein.

The above-described embodiments have been described in order to allow easy understanding of the present invention and do not limit the present invention. To the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for defining a process on a visual programming canvas, the method comprising:
   controlling a client device to display a visual programming canvas;
   controlling the client device to display, adjacent to the visual programming canvas, a plurality of programming blocks that can be added to the visual programming canvas;
   receiving a selection of a first programming block of the plurality of programming blocks to be executed within the process, wherein the first programming block refers to a class, and wherein the class comprises constituent components;
   controlling the client device to display a first visual block representing the first programming block on the visual programming canvas, wherein the first visual block provides access to the constituent components of the class, and wherein the constituent components include an input parameter;
   receiving a selection of the input parameter for the first programming block;
   controlling the client device to display an indication of the input parameter within the first visual block on the visual programming canvas;
   receiving a selection of a second programming block of the plurality of programming blocks to be executed subsequent to the first programming block in the process, wherein the second programming block refers to a method that returns a return value;
   controlling the client device to display a second visual block representing the second programming block and the return value on the visual programming canvas;
   controlling the client device to display a prototype compound block;
   after displaying the prototype compound block, forming a compound programming block from the first programming block and the second programming block;
   controlling the client device to display a compound visual block representing the compound programming block on the visual programming canvas, wherein the compound visual block identifies the input parameter as an input of the compound block and the return value as an output of the compound block; and
   generating output programming code for the compound block.

2. The method of claim 1, wherein receiving the selection of the first programming block comprises receiving user input data indicative of a dragging of the first programming block onto the visual programming canvas.

3. The method of claim 1, further comprising saving the compound block in a memory.

4. The method of claim 3, further comprising:
   receiving, via a graphical user interface, a name of the compound block; and
   updating a name of the saved compound block to be the received name.

5. The method of claim 1, wherein the compound programming block preserves a behavior of the first programming block and the second programing block, and wherein the compound visual block has fewer displayed elements than a combination of the first visual block and the second visual block.

6. The method of claim 5, wherein forming the compound programming block comprises determining which elements from the first visual block and the second visual block are the fewer displayed elements.

7. The method of claim 6, wherein the fewer displayed elements comprise unfilled inputs to the first visual block or the second visual block.

8. The method of claim 6, wherein the fewer displayed elements comprises unfilled outputs from the first visual block or the second visual block.

9. The method of claim 1, further comprising controlling the client device to update the display of the prototype compound block as aspects of the first programming block and the second programming block change.

10. The method of claim 1, wherein the output programming code comprises JavaScript.

11. The method of claim 1, wherein forming the compound programming block comprises determining whether any required elements are missing from the first programming block and the second programming block and, responsive to determining that a required element is missing, providing a placeholder for the required element.

12. The method of claim 1, wherein forming the compound programming block comprises determining whether an output data type of the first programming block differs from an expected input data type of the second programming block.

13. A system comprising:
   one or more processors; and memory having instructions stored thereon that, when executed by the one or more processors, cause the one or more processors to perform functions of:
  controlling a client device to display a visual programming canvas,
  controlling the client device to display, adjacent to the visual programming canvas, a plurality of programming blocks that can be added to the visual programming canvas,
  receiving a selection of a first programming block of the plurality of programming blocks to be executed within the process, wherein the first programming block refers to a class, and wherein the class comprises constituent components,
  controlling the client device to display a first visual block representing the first programming block on the visual programming canvas, wherein the first visual block provides access to the constituent components of the class, and wherein the constituent components include an input parameter, wherein the input parameter comprises a table name that refers to an incident report table,
  receiving a selection of the input parameter for the first programming block,
  controlling the client device to display an indication of the input parameter within the first visual block on the visual programming canvas,
  receiving a selection of a second programming block of the plurality of programming blocks to be executed subsequent to the first programming block in the process, wherein the second programming block refers to a method that returns a return value, wherein the return value of the method is indicative of a value of a record in the incident report table,
  controlling the client device to display a second visual block representing the second programming block and the return value on the visual programming canvas,
  forming a compound programming block from the first programming block and the second programming block, and
  controlling the client device to display a compound visual block representing the compound programming block on the visual programming canvas, wherein the compound visual block identifies the input parameter as an input of the compound block and the return value as an output of the compound block, and
  generating output programming code for the compound block.

14. The system of claim 13, wherein the compound programming block preserves a behavior of the first programming block and the second programing block, and wherein the compound visual block has fewer displayed elements than a combination of the first visual block and the second visual block.

15. The system of claim 13, wherein forming the compound programming block comprises determining whether any required elements are missing from the first programming block and the second programming block and, responsive to determining that a required element is missing, providing a placeholder for the required element.

16. The system of claim 13, wherein forming the compound programming block comprises determining whether an output data type of the first programming block differs from an expected input data type of the second programming block.

17. A method for defining a process on a visual programming canvas, the method comprising:
  controlling a client device to display a visual programming canvas;
  controlling the client device to display a plurality of programming blocks that can be added to the visual programming canvas;
  receiving a selection of a first programming block of the plurality of programming blocks to be executed within the process, wherein the first programming block has an associated input parameter;
  controlling the client device to display on the visual programming canvas a first visual block representing the first programming block and the input parameter;
  receiving a selection of a second programming block of the plurality of programming blocks to be executed subsequent to the first programming block in the process, wherein the second programming block refers to a method that returns a return value;
  controlling the client device to display on the visual programming canvas a second visual block representing the second programming block and the return value on the visual programming canvas;
  forming a compound programming block from the first programming block and the second programming block, wherein forming the compound programming block comprises defining the input parameter of the first programming block as an input to the compound programming block and defining the return value as an output of the compound programming block, wherein forming the compound programming block comprises determining whether any required elements are missing from the first programming block and the second programming block and, responsive to determining that a required element is missing, providing a placeholder for the required element; and
  generating output programming code for the compound block.

18. The method of claim 17, further comprising controlling the client device to display a compound visual block representing the compound programming block on the visual programming canvas.

19. The method of claim 17, further comprising receiving a selection of the input parameter for the first programming block.

20. A method for defining a process on a visual programming canvas, the method comprising:
  controlling a client device to display a visual programming canvas;
  controlling the client device to display a plurality of programming blocks that can be added to the visual programming canvas;
  receiving a selection of a first programming block of the plurality of programming blocks to be executed within the process, wherein the first programming block has an associated input parameter;
  controlling the client device to display on the visual programming canvas a first visual block representing the first programming block and the input parameter;
  receiving a selection of a second programming block of the plurality of programming blocks to be executed subsequent to the first programming block in the process, wherein the second programming block refers to a method that returns a return value;
  controlling the client device to display on the visual programming canvas a second visual block representing the second programming block and the return value on the visual programming canvas;

forming a compound programming block from the first programming block and the second programming block, wherein forming the compound programming block comprises defining the input parameter of the first programming block as an input to the compound programming block and defining the return value as an output of the compound programming block, wherein forming the compound programming block comprises determining whether an output data type of the first programming block differs from an expected input data type of the second programming block; and generating output programming code for the compound block.

* * * * *